US012000812B2

(12) United States Patent
Moteki et al.

(10) Patent No.: US 12,000,812 B2
(45) Date of Patent: Jun. 4, 2024

(54) DIFFERENTIAL REFRACTIVE INDEX MEASUREMENT METHOD, MEASUREMENT DEVICE, AND MEASUREMENT PROGRAM

(71) Applicant: JASCO CORPORATION, Tokyo (JP)

(72) Inventors: Tomohiro Moteki, Tokyo (JP); Miki Kuwajima, Tokyo (JP)

(73) Assignee: JASCO CORPORATION, Tokyo (JP)

( * ) Notice: Subject to any disclaimer, the term of this patent is extended or adjusted under 35 U.S.C. 154(b) by 444 days.

(21) Appl. No.: 17/601,182

(22) PCT Filed: Dec. 10, 2019

(86) PCT No.: PCT/JP2019/048271
§ 371 (c)(1),
(2) Date: Oct. 4, 2021

(87) PCT Pub. No.: WO2020/202647
PCT Pub. Date: Oct. 8, 2020

(65) Prior Publication Data
US 2022/0187257 A1 Jun. 16, 2022

(30) Foreign Application Priority Data
Apr. 5, 2019 (JP) .................. 2019-072504

(51) Int. Cl.
*G01N 21/41* (2006.01)
*B01J 20/291* (2006.01)
(Continued)

(52) U.S. Cl.
CPC ............ *G01N 30/74* (2013.01); *B01J 20/291* (2013.01); *G01N 1/14* (2013.01); *G01N 21/41* (2013.01);
(Continued)

(58) Field of Classification Search
CPC .......... G01N 30/74; G01N 1/14; G01N 21/41; G01N 30/32; G01N 2030/027;
(Continued)

(56) References Cited

U.S. PATENT DOCUMENTS 6,295,125 B1   9/2001  Tokieda et al.
2015/0057949 A1  2/2015  Weinberger et al.
(Continued)

FOREIGN PATENT DOCUMENTS

JP       S60-205362 A    10/1985
JP       H5-52749 U       7/1993
(Continued)

OTHER PUBLICATIONS

International Search Report issued in International Patent Application No. PCT/JP2019/048271, dated Mar. 10, 2020, along with an English translation thereof.
(Continued)

*Primary Examiner* — Robert R Raevis
(74) *Attorney, Agent, or Firm* — Greenblum & Bernstein, P.L.C.

(57) ABSTRACT

A method of reducing noise in an output signal of a differential refractive index detection part (RI detection part) of a dual-flow type with an analysis device having the RI detection part includes sending a sample liquid to a sample cell with a sample pump, sending a reference liquid to a reference cell with a reference pump, and detecting a change in direction of travel of light sequentially transmitted through the two cells with a light detector. Before starting RI measurement, a phase difference between the sample pump and the reference pump is adjusted so that a noise that occurs in an output signal of the light detector by propagation of pulsation from the sample pump within the sample cell and a noise that occurs in the output signal of the light detector by propagation of pulsation from the reference pump within the reference cell cancel each other.

13 Claims, 13 Drawing Sheets

(51) Int. Cl.
  *G01N 1/14* (2006.01)
  *G01N 30/32* (2006.01)
  *G01N 30/74* (2006.01)
  *G01N 30/02* (2006.01)

(52) U.S. Cl.
  CPC ....... *G01N 30/32* (2013.01); *G01N 2030/027* (2013.01); *G01N 2030/326* (2013.01)

(58) Field of Classification Search
  CPC ..... G01N 2030/326; G01N 2021/4146; G01N 21/4133; G01N 2021/414; G01N 2021/41553; B01J 20/291
  USPC ........ 73/1.02, 1.03, 53.1, 61.48, 64.56, 866; 356/16, 481, 517, 128–137
  See application file for complete search history.

(56) References Cited

U.S. PATENT DOCUMENTS

| | | |
|---|---|---|
| 2017/0010213 A1 | 1/2017 | Jingu et al. |
| 2018/0120272 A1 | 5/2018 | Trainoff |

FOREIGN PATENT DOCUMENTS

| | | |
|---|---|---|
| JP | H5-215738 A | 8/1993 |
| JP | H5-333016 A | 12/1993 |
| JP | H8-129004 A | 5/1996 |
| JP | 2001-33386 A | 2/2001 |
| JP | 2005-207876 A | 8/2005 |
| JP | 2010-175418 A | 8/2010 |
| WO | 2015/118668 A1 | 8/2015 |

OTHER PUBLICATIONS

Extended European Search Report issued in Corresponding EP Patent Application No. 19923034.3, dated Nov. 29, 2022.

Without Adjustment of Phase Difference between Pumps

Noise Waveform before Optimization (For Comparison)

FIG. 11 (A)
FIG. 11 (B)
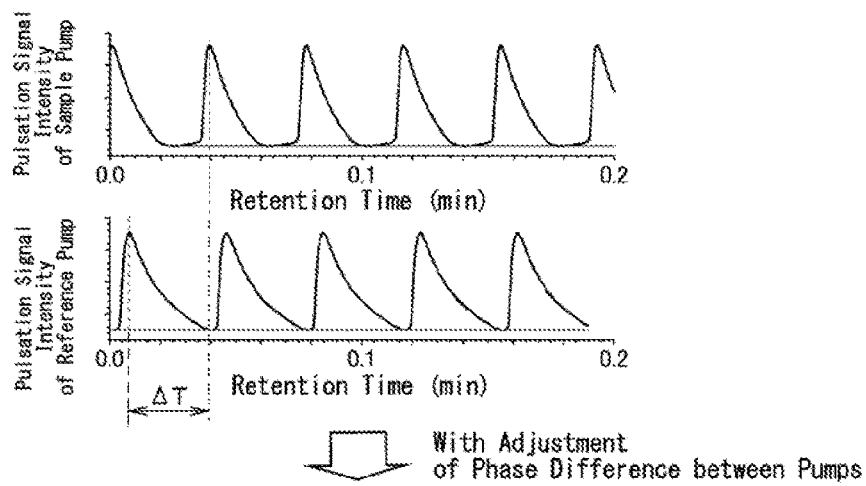
FIG. 11 (C)
FIG. 11 (D)
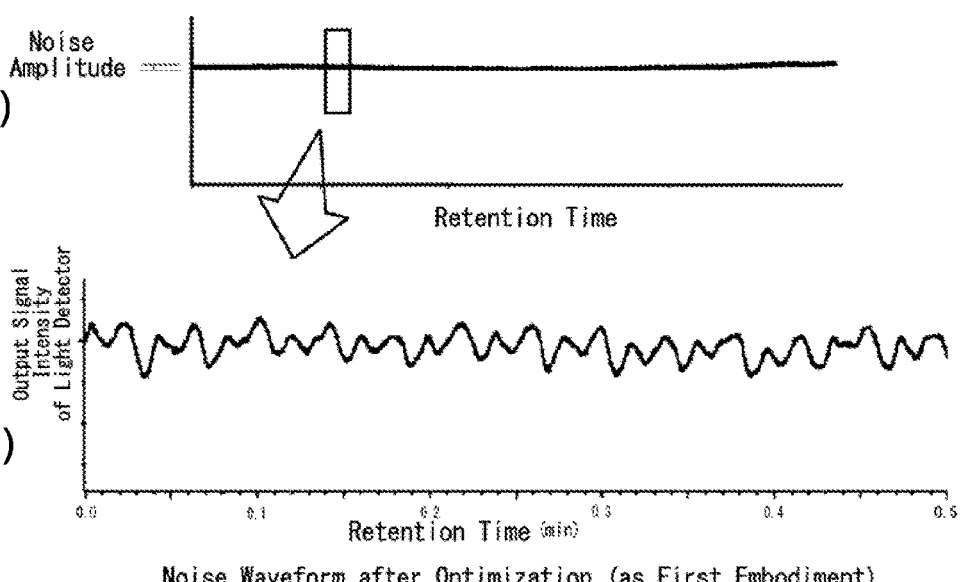
Noise Waveform after Optimization (as First Embodiment)

DIFFERENTIAL REFRACTIVE INDEX MEASUREMENT METHOD, MEASUREMENT DEVICE, AND MEASUREMENT PROGRAM

RELATED APPLICATION

This application claims the priority of Japanese Patent Application No. 2019-072504 filed on Apr. 5, 2019, the disclosure of which is incorporated herein by reference in its entirety.

TECHNICAL FIELD

The present invention relates to measurement of a differential refractive index by an analysis device comprising a differential refractive index detector.

BACKGROUND ART

There is a conventional analysis device comprising a differential refractive index detection part (called as RI detection part) that uses a detection cell of which a sample cell and a reference cell are integrated, emits light to transmit both of a sample liquid in the sample cell and a reference liquid in the reference cell, and detects the difference in the refractive indexes between the both liquids based on the position of the transmitted light.

In this analysis device, there are channels for sending the sample liquid and the reference liquid to cells of the RI detection part, and there are two types of configurations of the channels (refer to paragraph [0003] of Patent Literature 1). The first configuration is a so-called reference-liquid enclosing type, and comprises: one liquid-sending pump, a channel of the sample side that connects from the liquid-sending pump to the sample cell; a channel of the reference side that connects from the same liquid-sending pump to the reference cell; and a switching valve that switches these two channels. It is called as a "single-flow type" herein. In the single-flow type, the reference liquid is enclosed in the reference cell, and then the channel is switched to send the sample liquid to the sample cell. Since the differential refractive index between the both liquids are measured while the reference liquid is enclosed in the reference cell, it is disadvantageous in that the baseline of the output signal of the detector drifts easily.

The second configuration is a so-called "dual-flow type (parallel-flow type)". Liquid-sending pumps are provided respectively to the sample cell and the reference cell, so that liquid can be sent simultaneously to the reference cell and the sample. In the dual-flow type, conditions of both liquids during measurement become closer than that of the single-flow type, and the baseline does not drift easily. It is advantageous in a continuous measurement, a long-time measurement, and a peak-area calculation.

CITATION LIST

Patent Literature

Patent Literature 1: Japanese Unexamined Utility-Model Publication No. H5-52749 A

SUMMARY OF INVENTION

Technical Problem

The inventors aimed to further improve performance of the dual-flow type analysis device, and worked to reduce noise contained in the output signal of the RI detection part. The inventors considered that, in the dual-flow type, pulsations of two liquid-sending pumps affect the liquids contained in respective cells, and thus reduction of noise is prevented; therefore, the inventors diligently studied on the same. The object of the present invention is to provide a method for measuring a differential refractive index, a device for measuring a differential refractive index, and a program for measuring a differential refractive index, which are able to reduce noise in the output signal of RI detection part and to measure the differential refractive index stably.

Solution to Problem

That is, a measurement method of a differential refractive index of the present invention is a method for measuring a differential refractive index between a sample liquid and a reference liquid by sending the sample liquid to a sample cell with a sample pump, sending the reference liquid to a reference cell with a reference pump, and detecting a change in direction of travel of light sequentially transmitted through the sample cell and the reference cell with a light detector, the measurement method comprising:

an adjustment-value determination step of determining an adjustment value of a phase difference between the sample pump and the reference pump based on noise waveform informations that occur in an output signal of the light detector, so that the phase difference is adjusted according to a difference in lengths of channels of the sample liquid and the reference liquid or a difference in devices connected to the channels of the sample liquid and the reference liquid; and a phase-difference adjustment step of adjusting the phase difference between the sample pump and the reference pump before starting measurement of the differential refractive index, wherein the phase-difference adjustment step is a step of adjusting the phase difference between the sample pump and the reference pump so that a noise that occurs in the output signal of the light detector by propagation of pulsation from the sample pump within the sample cell and a noise that occurs in the output signal of the light detector by propagation of pulsation from the reference pump within the reference cell cancel each other.

By adjusting the phase difference between the sample pump and the reference pump in accordance with the measurement method of the present invention, the noise contained in the output signal of the light detector due to pulsation propagated to the sample cell and the noise contained in the output signal of the light detector due to pulsation propagated to the reference cell cancel each other, so that the noise of the output signal of the RI detection part reduces. For example, devices that meet objects and conditions of analysis such as a sample injection part, a separation column, and other detectors are connected to the channel of the sample side. Whereas, from various circumstances, it cannot be necessarily said that the same devices as in the channel of the sample side are connected to the channel of the reference side. In addition, the length of the channel of the sample side and the length of the channel of the reference side may be largely different depending on environmental conditions of analysis. From such differences, the volumes of the two channels (may be called as the system volume) of the sample side and the reference side may differ, and propagation coefficients of pulsation in each channel may differ. According to the measurement method of the present invention, the noise of the output signal of the RI detection part can be definitely reduced regardless of the difference of the propagation coefficients of pulsation in each channel.

The adjustment-value determination step preferably determines the adjustment value of the phase difference between the sample pump and the reference pump before the phase-difference adjustment step.

The adjustment-value determination step preferably comprises:

a step of acquiring a phase information of the sample pump and the noise waveform informations in the output signal of the light detector in a state that the reference pump is stopped sending a solvent to the reference cell after enclosing the solvent in the reference cell, and the sample pump is operating to send the solvent to the sample cell;

a step of acquiring the phase information of the reference pump and the noise waveform informations in the output signal of the light detector in a state that the sample pump is stopped sending the solvent to the sample cell after enclosing the solvent in the sample cell, and the reference pump is operating to send the solvent to the reference cell; and a step of determining the adjustment value of the phase difference between the two pumps by comparing the two noise waveforms in a state that two phases of the two pumps match based on the phase informations of the two pumps and the two noise waveform informations, by reading out a phase difference between the two noise waveforms, and by determining the adjustment value of the phase difference between the two pumps based on the phase difference between the two noise waveforms.

According to the measurement method of the present invention, the adjustment value of the phase difference between the sample pump and the reference pump can be determined with relatively easy steps. As described above, the inventors considered that the noise of the output signal of the RI detection part is one of which the noise due to pulsation propagated to the sample cell and the noise due to pulsation propagated to the reference cell are overlapped. Therefore, the inventors decided to individually acquire the noise waveform that occurs when each pump is driven individually, and derive the condition of the phase difference between the pumps such that the two noise waveforms cancel each other. For example, when same analysis device is used, the devices connected to the two channels of the sample side and the reference side are variously changed, and the lengths of the channels are changed too. According to the measurement method of the present invention, the adjustment value of the phase difference between the pumps in accordance with the system volume can be determined easily, so that it can also be applied to a case when the system configuration of the analysis device is changed frequently.

In the step of acquiring the noise waveform informations of the sample pump, the reference pump is preferably stopped in a state of the enclosed reference cell with the solvent, and in the step of acquiring the noise waveform informations of the reference pump, the sample pump is preferably stopped in a state of the enclosed sample cell with the solvent.

Or, in the step of acquiring the noise waveform informations of the sample pump of the measurement method of the present invention, a drain valve of the discharge side of the reference pump is preferably released while the reference pump is driven in a state of the enclosed reference cell with the solvent, and in the step of acquiring the noise waveform informations of the reference pump, a drain valve of the discharge side of the sample pump is preferably released while the sample pump is driven in a state of the enclosed sample cell with the solvent.

As described above, the noise waveform informations of the sample side and the reference side may be read out in a state that only one pump is driven and the other pump is stopped, or in a state that one pump is purged (a state of flowing to a drain) while both of the pumps are driven. In particular, in the latter case, the action for stopping both pumps becomes unnecessary, so that the time for reading out the noise waveform informations can be shortened.

In the adjustment-value determination step, it is preferred to comprises a step of adjusting time axes of the two noise waveform informations based on the phase informations of the two pumps so that phases of the two pumps match.

By adjusting the time axes of the two noise waveform informations with the phase information of the pump acquired simultaneously with the noise waveform like the adjustment-value determination step, the phases of pumps can be matched when the noise waveform information is acquired. As a result, the phase difference between the noise waveforms in a state that the phases of the pumps are matched can be read out easily for the two noise waveforms acquired individually. Accordingly, the condition of the phase difference between pumps such that two noise waveforms cancel each other can be derived easily.

A measurement device of a differential refractive index of the present invention comprises:

a detection part for the differential refractive index having a sample cell that a sample liquid passes through, a reference cell that a reference liquid passes through, and a light detector that detects a change in direction of travel of light that sequentially transmitted through the two cells;

a sample pump that sends a solvent to the sample cell;

a sample injection part that is provided on a channel from the sample pump to the sample cell and injects a sample to the solvent sent from the sample pump to form the sample liquid;

a reference pump that sends the solvent to the reference cell as the reference liquid; and a control device, for measuring the differential refractive index between the sample liquid and the reference liquid based on an output signal of the light detector, wherein the control device comprises:

an adjustment-value determination means that determines an adjustment value of a phase difference between the sample pump and the reference pump based on noise waveform informations that occur in the output signal of the light detector, according to a difference in lengths of channels of the sample liquid and the reference liquid or a difference in devices connected to the channels of the sample liquid and the reference liquid; and a phase-difference adjustment means that adjusts the phase difference between the sample pump and the reference pump so that a noise that occurs in the output signal of the light detector by propagation of pulsation from the sample pump within the sample cell and a noise that occurs in the output signal of the light detector by propagation of pulsation from the reference pump within the reference cell cancel each other.

According to the configuration of the measurement device of the present invention, the phase difference between the sample pump and the reference pump is adjusted, so that the noise contained in the output signal of the light detector due to pulsation propagated to the sample cell and the noise contained in the output signal of the light detector due to pulsation propagated to the reference cell cancel each other, and the noise of the output signal of the RI detection part is reduced. Accordingly, the analysis device with less noise in the output signal of the RI detection part can be provided.

The measurement device is preferably a liquid chromatograph (LC) of which a separation part for separating the sample liquid into each component is provided on the channel from the sample injection part to the sample cell, and more preferably is a gel permeation chromatograph (GPC).

When the measurement device of the present invention is applied to a liquid chromatography (LC), particularly a gel permeation chromatography (GPC), the noise level of the baseline of the chromatogram of RI to be measured is reduced, and the effect of the present invention can be exhibited largely.

A measurement program of a differential refractive index of the present invention makes a computer to function as:

a drive control means that controls drive of a sample pump to send a sample liquid to a sample cell;

a drive control means that controls drive of a reference pump to send a reference liquid to a reference cell; and a signal acquisition means that acquires an output signal of a light detector that detects light sequentially transmitted through the sample cell and the reference cell, wherein the measurement program that further makes the computer to function as:

an adjustment-value determination means that determines an adjustment value of a phase difference between the sample pump and the reference pump based on noise waveform informations that occur in the output signal of the light detector, according to a difference in lengths of channels of the sample liquid and the reference liquid or a difference in devices connected to the channels of the sample liquid and the reference liquid; and a phase-difference adjustment means that adjusts the phase difference between the sample pump and the reference pump before starting measurement of the differential refractive index, so that a noise that occurs in the output signal of the light detector by propagation of pulsation from the sample pump within the sample cell and a noise that occurs in the output signal of the light detector by propagation of pulsation from the reference pump within the reference cell cancel each other.

It is preferred to further make the computer to function as:

a phase-information acquisition means that acquires respective phase information of the sample pump and the reference pump;

a noise-waveform-information acquisition means that acquires noise waveform informations that occur in the output signal of the light detector together with the phase information of the sample pump in a state that the reference pump is stopped sending a solvent to the reference cell after enclosing the solvent in the reference cell, and the sample pump is operating to send the solvent to the sample cell; and a noise-waveform-information acquisition means that acquires noise waveform informations that occur in the output signal of the light detector together with the phase information of the reference pump in a state that the sample pump is stopped sending a solvent to the sample cell after enclosing the solvent in the sample cell, and the reference pump is operating to send the solvent to the reference cell, wherein adjustment-value determination means determines the adjustment-value of the phase difference between the two pumps by comparing the two noise waveforms in a state that two phases of the two pumps match based on the phase informations of the two pumps and the two noise waveform informations, by reading out the phase difference between the two noise waveforms, and by determining the adjustment-value of the phase difference between the two pumps based on the phase difference between the two noise waveforms.

Here, the phase-information acquisition means is preferably a pulsation-information acquisition means that acquires pulsation-waveform informations of the two pumps, and regards the acquired pulsation-waveform informations of the pumps as the phase informations of the pumps.

The noise-waveform-information acquisition means of the sample pump preferably stops the reference pump in a state of the enclosed reference cell with the solvent, and the noise-waveform-information acquisition means of the reference pump preferably stops the sample pump in a state of the enclosed sample cell with the solvent.

Or, the noise-waveform-information acquisition means of the sample pump preferably releases a drain valve of the discharge side of the reference pump while the reference pump is driven in a state of the enclosed reference cell with the solvent, and the noise-waveform-information acquisition means of the reference pump preferably releases a drain valve of the discharge side of the sample pump while the sample pump is driven in a state of the enclosed sample cell with the solvent.

According to the above configuration of the measurement program, adjustment of the phase difference between pumps with a computer can be automated and can be remotely controlled via a wired or wireless network.

In the present invention, when determining the adjustment value of the phase difference between the sample pump and the reference pump, the phase information of the pump is acquired together with the output signal of the light detector. For example, the phase information of the pump may be acquired based on a detection signal of periodic actions of the pump (such as displacement position of a plunger, rotation position of a cam, etc.). Or, the phase information of pulsation that occurs by periodic actions of the pump may be acquired as the phase information of the pumps. For example, the phase information of the pump may be acquired based on a detection signal of a solvent pressure immediately after discharge of the pump.

Advantageous Effects of Invention

According to the present invention, in the analysis device comprising the dual-flow type RI detection part, noise of the output signal of the RI detection part can be reduced, and a stable measurement of the differential refractive index can be achieved.

BRIEF DESCRIPTION OF DRAWINGS

FIG. 6(B) depicts one example of a pulsation waveform of a sample pump at that time.

FIG. 7(B) depicts one example of the pulsation waveform of the reference pump at that time.

FIG. 10 (A) and FIG. 10(B) are examples of the pulsation waveforms of each pump when both pumps are driven in a synchronous mode, and FIG. 10(C) and FIG. 10(D) are waveform diagrams of baseline signals detected at that time.

FIG. 11 (A) and FIG. 11(B) are examples of the pulsation waveforms of each pump after adjustment of the phase difference between pumps of the first embodiment, and FIG. 11(C) and FIG. 11(D) are waveform diagrams of baseline signals detected at that time.

DESCRIPTION OF EMBODIMENTS

Figure 1:
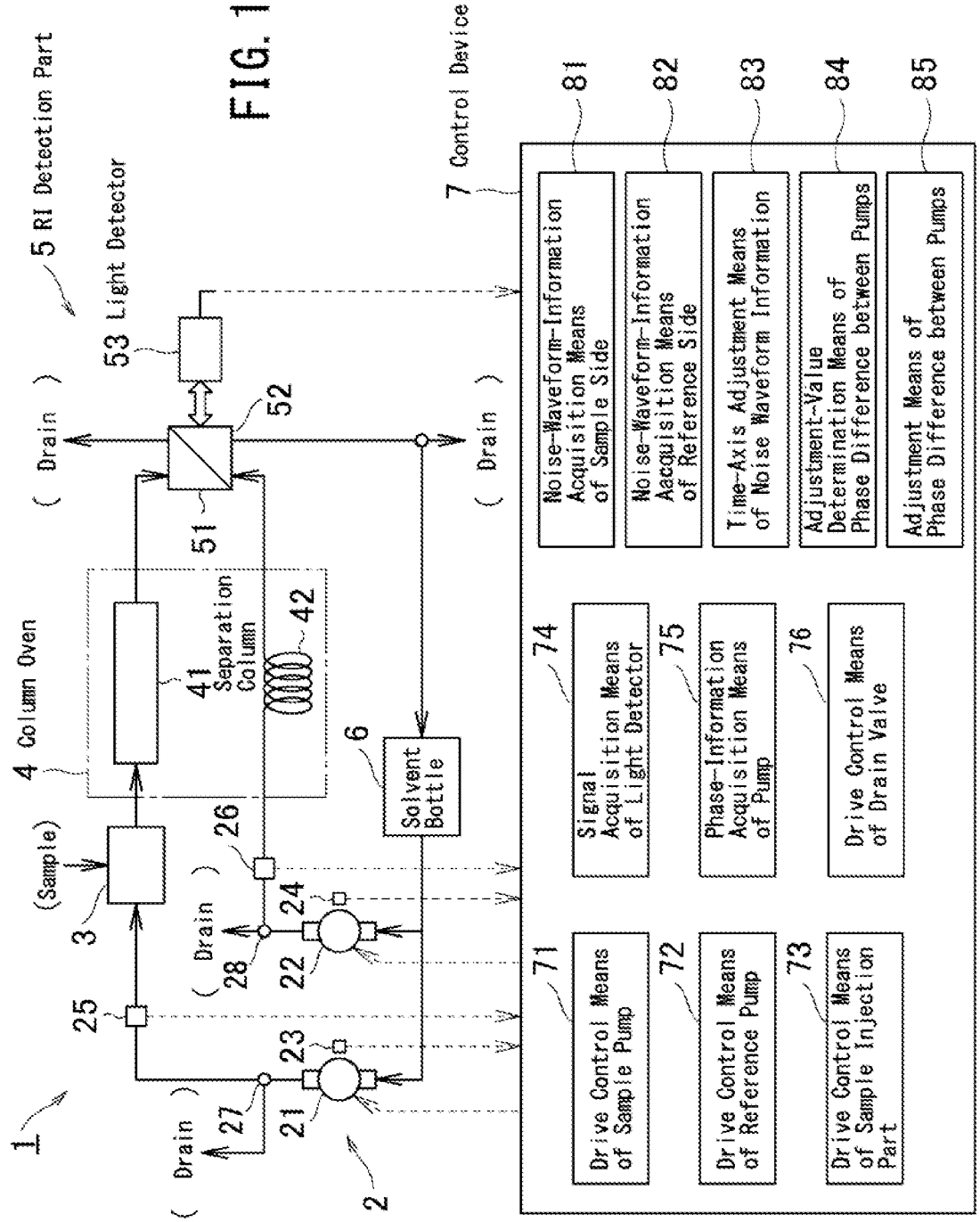
FIG. 1 is a block diagram of a whole configuration of a liquid chromatography of a first embodiment.

FIG. 1 is a schematic configuration of a liquid chromatograph 1 according to one embodiment of the present invention. This liquid chromatograph 1 is a dual-flow type, and comprises a pair of liquid-sending pumps 2, a sample injection part 3, a column oven 4, an RI detection part 5, a solvent bottle 6, and a control device 7 as main constituents.

The pair of liquid-sending pumps 2 are a sample pump 21 and a reference pump 22, and both are reciprocating pumps. Each pump reciprocates a plunger (or a piston) backward and forward, and repeats an action of sucking a solvent in the solvent bottle 6 and an action of discharging the solvent by compression. Drive system of reciprocation of the plunger is mainly a cam type, but it may be of other types such as a crank type or ball-screw type.

The solvent discharged by the sample pump 21 flows a channel of the sample side from the sample pump 21 to the sample cell 51 of the RI detection part 5. The sample injection part 3 and a separation column 41 are connected on this channel. Whereas, the solvent discharged by the reference pump 22 flows a channel of the reference side from the reference pump 22 to the reference cell 52 of the RI detection part 5 as a "reference liquid". A reference loop 42 is connected on this channel.

The sample injection part 3 has at least either of an automatic injector or a manual injector, and injects a sample to the solvent from the sample pump 21. The solvent to which the sample is injected is called as a "sample liquid".

The two channels of the sample side and the reference side passes through the column oven 4. In the column oven 4, the separation column 41, the reference loop 42, and a heating device for heating the separation column 41 and the reference loop 42 are housed therein.

The sample liquid separates into each component by a packing material inside during the process of passing through the separation column 41, and is discharged for each separated component from the separation column 41. The liquid chromatograph 1 with the RI detection part 5 like the present embodiment is particularly suitable in molecular weight measurement of polymers. In particular, the liquid chromatograph called as the gel permeation chromatograph (GPC) uses a separation column consisting of a porous packing material to acquire a chromatogram of the differential refractive index, so that physical property information such as molecular weights and molecular weight distribution of polymers is acquired from the retention time and the peak shape of the elution peak.

The reference loop 42 is a pipe that is winded in loops. The system volume of the channel of the reference side is adjusted by changing the loop length of the reference loop 42.

The RI detection part 5 has a detection cell, a light source (not shown) for irradiating a light to the detection cell, and a light detector for detecting the transmitted light of the detection cell. The detection cell is a cell formed of a sample cell 51 and a reference cell 52 that are integrated via a partition plate. The light detector 53 is provided in a direction of travel of the transmitted light sequentially transmitted through the sample liquid in the sample cell 51 and the reference liquid in the reference cell 52, and detects to which position of a detection plane the transmitted light was made incident on. Then, the position information of the transmitted light from the light detector 53 is sent to the control device 7 according to the magnitude of the intensity of the output signal. The control device 7 calculates the differential refractive indexes (RI) between the sample liquid and the reference liquid based on the output signal from the light detector 53.

Figure 2:
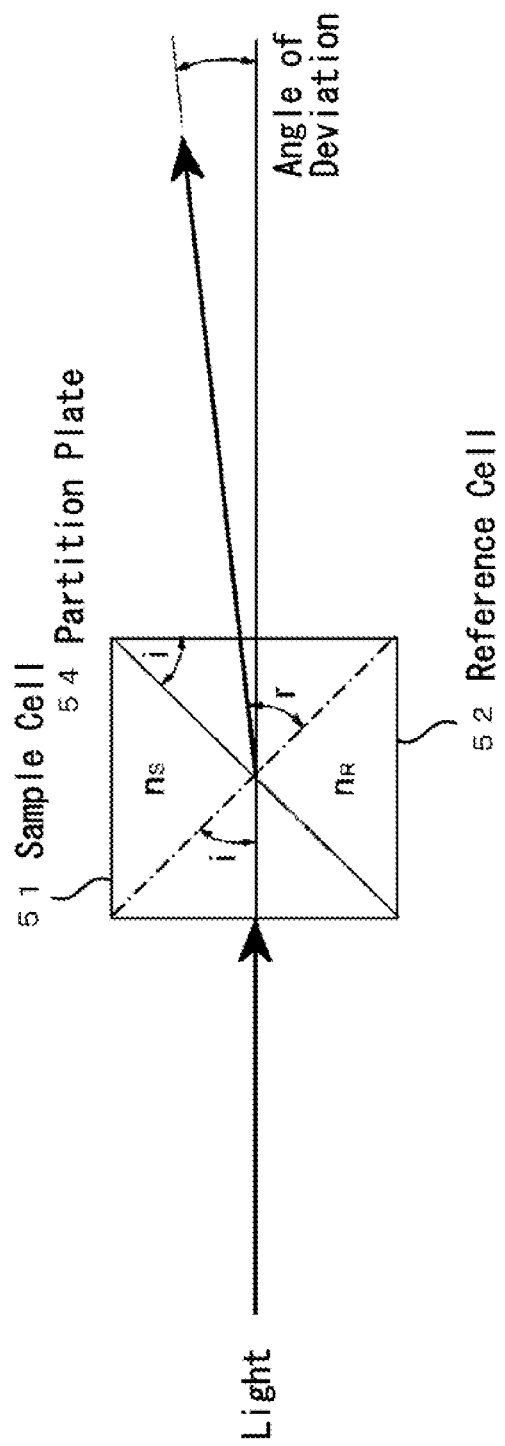
FIG. 2 depicts a general detection principle of a differential refractive index detection part (RI detection part) of the first embodiment.

The detection principle of RI is briefly described with FIG. 2. FIG. 2 is a top view of the detection cell. The external shape of the detection cell is a prism shape having a square upper face, and the inner space is partitioned into two by a partition plate 54 in the cell. One is the sample cell 51, and its external shape is a prism shape having an upper face of an isosceles right triangle. The other is the reference cell 52, and its external shape is also a prism shape having an upper face of an isosceles right triangle. Although not shown in the drawings, the sample cell 51 is formed with an inlet of the liquid entering into the cell and an outlet of the liquid, and the reference cell 52 is also formed with an inlet and an outlet of the liquid.

When the sample liquid having a refractive index ns is put into the sample cell 51 and the reference liquid having a different refractive index $n_R$ is put into the reference cell 52, the light irradiated perpendicular to the side wall of the sample cell 51 refracts at an interface of the liquids due to the difference between the refractive indexes of the two liquids. As indicated by the angle of incidence i and the angle of emergence r (r>i) to the partition plate 54 in the cell, the transmitted light of the detection cell travels in the direction tilted for the deviation angle relative to the optical axis of the light from the light source. Upon execution of RI detection, the reference liquid (only the solvent) is sent to the reference cell, and a plurality of components separated in the separation column at the front part is sequentially sent with the solvent to the sample cell 51, so that the differential refractive index between the two liquids change for each component sent from the cell, and the deviation angle of the transmitted light of the detection cell changes. Accordingly, a slight change in the differential refractive index between the sample liquid and the reference liquid can be calculated based on the position information of the direction of travel of the transmitted light detected by the light detector 53.

The configuration of the detection cell is not limited to the configuration of FIG. 2. For example, when the emergence plane of the detection cell is changed to a reflection plane, the light that reflected the reflection plane goes through the detection cell again, and exits from the incidence plane side. Accordingly, the transmitted light from the detection cell can be detected on the same side as the light source.

When describing along the channel of the sample side with FIG. 1, the solvent in the solvent bottle 6 is sent to the sample injection part 3 by the sample pump 21, and the sample is injected thereto. The sample liquid from the sample injection part 3 is sent to the separation column 41 to be separated into each component. The sample liquid of which each component is separated is sent to the sample cell 51 of the RI detection part 5. The sample liquid that entered from the inlet of the sample cell 51 is discharged from the outlet and passes through the drain to be wasted.

Whereas, in the channel of the reference side, the solvent in the solvent bottle 6 is sent to the reference loop 42 as the reference liquid by the reference pump 22. The reference liquid from the reference loop 42 is sent to the reference cell 52 of the RI detection part 5. The reference liquid that entered from the inlet of the reference cell 52 is discharged from the outlet and passes through the drain to be wasted. When the reference liquid is to be reused, the channel may be switched in front of the drain, so that the reference liquid may be collected to the solvent bottle 6.

In the RI detection part 5, heat exchangers may be connected to the channels in front of the respective inlets of the sample cell 51 and the reference cell 52. In this case, the sample liquid passes through the heat exchanger and then enters the sample cell 51, and the reference liquid passes through the heat exchanger and then enters the reference cell 52. A UV absorbance detector for detecting both of the differential refractive index and UV absorbance of the separated components may be connected to the channel between the separation column 41 and the RI detection part 5 of FIG. 1.

Next, the configuration of the control system of the liquid chromatograph 1 of the present embodiment is described.

As shown in FIG. 1, the control device 7 comprises an arithmetic processing means such as a computer, and is electrically connected to devices such as liquid-sending pumps 21, 22, the sample injection part 3, the column oven 4, and the light detector 53. The electrical connection is partially shown with dashed lines in FIG. 1. That is, the control device 7 receives signals of the phase information of each pump from the phase detectors 23, 24 of pumps provided to the liquid-sending pumps 21, 22, and receives signals of the pulsation-waveform information of each pump from the pulsation detectors 25, 26 such as a pressure gauge provided to the discharge ports of the liquid-sending pumps 21, 22. Whereas, the control device 7 sends a control signal to drive the motors of each pump. In addition, the control device 7 receives the output signal from the light detector 53.

In a case of a cam-drive reciprocation pump, for example, when the rotation axis of the cam is rotated by the driving force of the motor, the head of the plunger in contact with the cam surface all the time displaces backward and forward depending on eccentricity of the cam.

In the present embodiment, the phase detectors 23, 24 that detect the phases of pumps are configured with a chopper and a photointerrupter. The chopper is configured with portions extended from the rotation axis of the cam to one direction perpendicular to the rotation axis. The photointerrupter is provided to block light only for one time during one rotation of the chopper rotating around the rotation axis. By detecting the rotation position of the axis of the cam with such phase detectors 23, 24, a periodic action of the pump having one reciprocation of the plunger as one cycle, i.e., the phase state of the pump, can be monitored.

Or, instead of the phase detectors 23, 24, a phase detector that directly detects the displacement position of the plunger may be used to acquire the phase information of pumps. Other than the above, the phase of the pump may be detected with a means for detecting the control signal to a cam-drive motor or a ball-screw drive motor for reciprocating the plunger (for example, when controlling the rotation amount of the motor with an input clock number like a stepping motor, the clock number may be used).

When using the chopper and the photointerrupter, the chopper and the photointerrupter are mounted to match the position of the plunger of the pump 21 at a timing when the chopper of the sample pump 21 blocks the light and the position of the plunger of the pump 22 at a timing when the chopper of the reference pump 22 blocks the light.

The control device 7 stores a program that makes the control device 7 to function as a function means (sync-mode means) that synchronously operates the two pumps 21, 22. For example, the control device 7 may be provided with one control board that drives and controls the sample pump 21 and the reference pump 22 with the same motor clock signal.

The control device 7 makes the plungers of each pump to reciprocate for one time at a predetermined time set within in a range from 0.1 second to several hundreds of seconds, for example. The compressed state and the decompressed state of the solvent in the pump is repeated periodically at the same cycle as the reciprocation of the plunger. Such periodic change of the liquid-sending pressure becomes the so-called pulsation and propagates through the channel. In the present embodiment, separately from the phase detectors 23, 34 of the pumps, pulsation detectors 25, 26 for detecting the solvent pressure may be provided to the discharge port of the pump or on the channel at a predetermined distance from the discharge port, and detection signals thereof may be used as pulsation signals of the pumps. Other than the above, pulsation that occurs by the pump may be detected from a current-value waveform of the drive motor of the pump.

The phase detectors 23, 24 are provided as a means for detecting the phases of pumps, and the pulsation detectors 25, 26 are provided as a means for detecting pulsation that occurs by the pumps; and although they are provided separately in the present embodiment, both of the phase and pulsation of pumps may be detected with either one of the means for detection.

The control device 7 is depicted with function blocks in FIG. 1. The computer executes a measurement program, so that the control device 7 functions as a means for executing the plurality of function blocks depicted in FIG. 1.

First, the computer executes the measurement program, so that the control device 7 functions as a drive control means 71 of the sample pump, a drive control means 72 of the reference pump, a drive control means 73 of the sample injection part, a signal acquisition means 74 that acquires the output signal of the light detector, a phase-information acquisition means 75 that acquires the phase information of the pump, and a drive control means 76 of the drain valve of the discharge side of the pump.

The function of the drive control means 71 of the sample pump is to drive the drive motor of the sample pump 21 at a predetermined rotation speed, and a drive command signal such as a PWM signal is sent to the sample pump 21. This drive control means 71 maintains the rotation speed of the drive motor at a predetermined speed based on the phase information of the reciprocation of the sample pump 21 acquired by the phase-information acquisition means 75.

The function of the drive control means 72 of the reference pump is to drive the drive motor of the reference pump 22 at the same rotation speed as the drive motor of the sample pump 21, and a drive command signal such as a PMW signal is sent to the reference pump 22. This drive control means 72 also controls the rotation speed of the drive motor based on the phase information of the reciprocation of the reference pump 22 acquired by the phase-information acquisition means 75.

The function of the drive control means 73 of the sample injection part is to inject the sample to the sample injection part 3 such as an automatic injector.

The function of the signal acquisition means 74 of the light detector is to acquire the output signal of the light detector 53. That is, the signal acquisition means 74 reads out the change in time of the output signal intensity from the light detector 53 that changes in accordance with the differential refractive index between the sample liquid and the reference liquid. The function of the drive control means 76 of the drain valve is to open and close the drain valves 27, 28 respectively provided between the pumps 21, 22 and the pulsation detectors 25, 26 when acquiring noise waveform informations to be described later.

The computer executes a phase-difference adjustment program contained in the measurement program, so that the control device 7 functions as a noise-waveform-information acquisition means 81 of the sample side, a noise-waveform-information acquisition means 82 of the reference side, a time-axis adjustment means 83 of the noise waveform information, an adjustment-value determination means 84 of the phase difference between pumps, and an adjustment means 85 of the phase difference between pumps.

The function of the noise-waveform-information acquisition means 81 of the sample side is to acquire the noise waveform of the output signal of the RI detection part 5 due to pulsation generated by the sample pump 21. Specifically, the noise-waveform-information acquisition means 81 of the sample side drives the reference pump 22, encloses the solvent in the reference cell 52, and stops the reference pump 22 in such state; and also drives the sample pump 21 and maintains a state of the solvent being sent to the sample cell 51. Then, the noise-waveform-information acquisition means 81 of the sample side acquires the output signal from the light detector 53 together with the phase information of the sample pump 21 from the phase detector 23, and reads out the noise waveform information contained in the output signal.

When acquiring the noise waveform information of the sample side, the state of only the sample pump 21 is sending the solvent can be achieved while the reference pump 22 is driven. For example, as shown in FIG. 1, by releasing the drain valve 28 provided to the discharge port of the reference pump 22, the solvent discharged from the reference pump 22 is sent (purged) to the drain. Accordingly, the sending of the solvent to the reference cell 52 by the reference pump 22 can be stopped without stopping the driving of the reference pump 22.

The function of the noise-waveform-information acquisition means 82 of the reference side is to acquire the noise waveform of the output signal of the RI detection part 5 due to pulsation generated by the reference pump 22. Specifically, the noise-waveform-information acquisition means 82 of the reference side drives the sample pump 21, encloses the solvent in the sample cell 51, and stops the sample pump 21 in such state; and also drives the reference pump 22 and maintains a state of the solvent being sent to the reference cell 52. Then, the noise-waveform-information acquisition means 82 of the reference side acquires the output signal from the light detector 53 together with the phase information of the reference pump 22 from the phase detector 24, and reads out the noise waveform information contained in the output signal.

Like in the sample side, when acquiring the noise waveform information of the reference side, the state of only the reference pump 22 is sending the solvent can be achieved while the sample pump 21 is driven. That is, by releasing the drain valve 27 of the discharge side of the sample pump 21, the solvent discharged from the sample pump 21 is sent to the drain. In the control device 7 of the present embodiment, the drain valves 27, 28 with automatic control valves are configured to open and close automatically by the drive control means 76 of the drain valves; however, it is not limited to this configuration. A manual drain valve may be used, for example, to manually open and close the drain valve.

The function of the time-axis adjustment means 83 of the noise waveform information is to adjust the time axes of the two noise waveform informations acquired by the noise-waveform-information acquisition means 81, 82 to match the phases of the two pumps 21, 22 based on the phase information of the pumps 21, 22 acquired by the phase-information acquisition means 75. That is, the noise waveform informations read out by the noise-waveform-information acquisition means 81, 82 of the sample side and the reference side are informations of the output signal of the light detector 53 detected in a state that the solvent is being sent to the detection cell by one pump and the sending of the solvent to the detection cell by the other pump is being stopped. Accordingly, in order to compare the two noise waveforms, it is necessary to match the phase of the sample pump 21 during measurement of the noise waveform of the sample side and the phase of the reference pump 22 during measurement of the noise waveform of the reference side.

The function of the adjustment-value determination means 84 of the phase difference between pumps is to read out the phase difference between the noise waveforms from the two noise waveform informations of which the time axes are adjusted by the time-axis adjustment means 83, and to determine the adjustment value (offset angle) of the phase difference between the pumps 21, 22 based on the phase difference between the noise waveforms.

The function of the adjustment means 85 of the phase difference between pumps is to actually execute adjustment of the phase difference between the two pumps 21, 22 with the adjustment value determined by the adjustment-value determination means 84.

Figure 3:
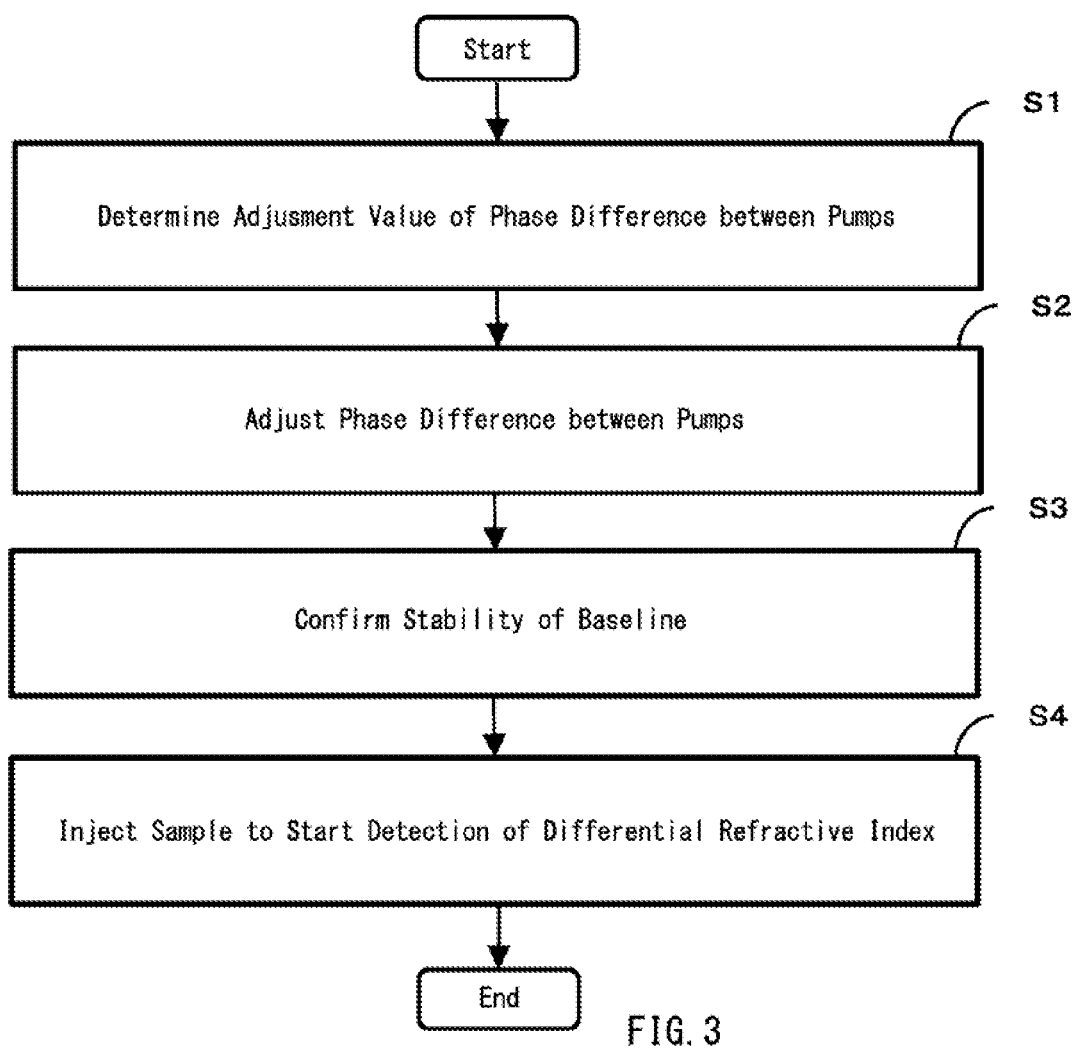
FIG. 3 is a flow chart of RI measurement performed by the liquid chromatography of the first embodiment.
Figure 4:
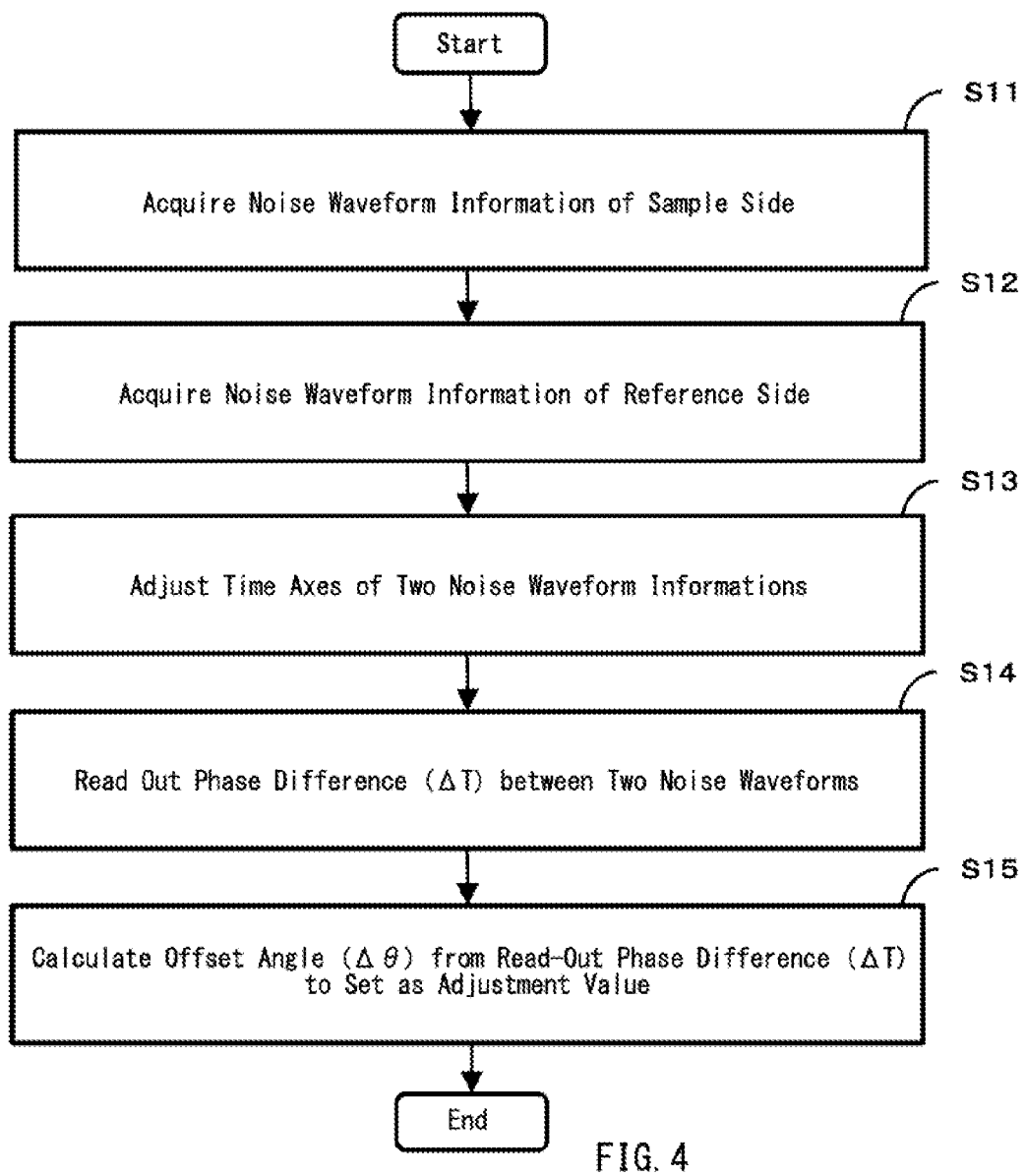
FIG. 4 is a flow chart for determining an adjustment value of a phase difference between pumps of the first embodiment.
Figure 5:
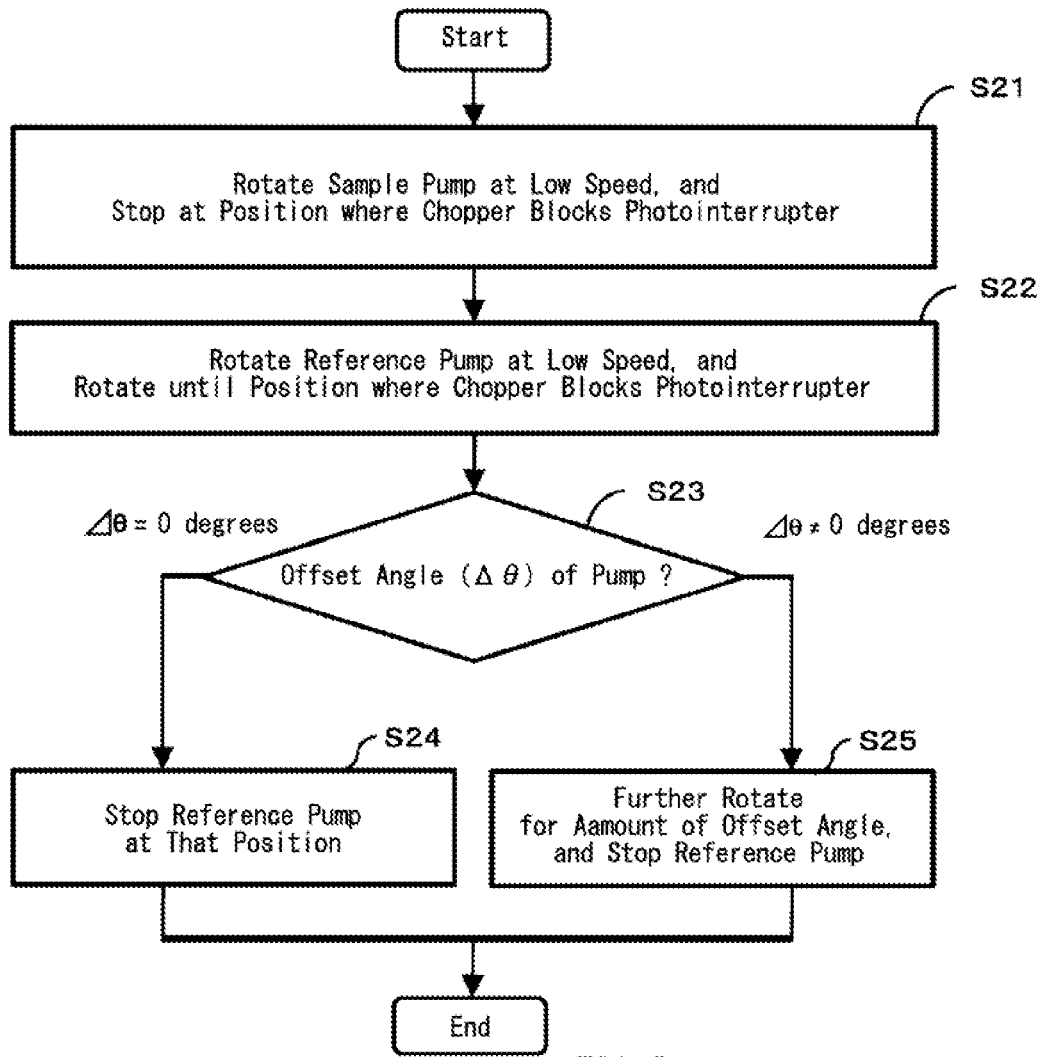
FIG. 5 is a flow chart for adjusting the phase difference between pumps of the first embodiment.

Steps of RI measurement by the control device 7 are described in details with the flow charts of FIG. 3 to FIG. 5, and one specific example of the signal waveform (FIG. 6 to FIG. 9). Overall steps of the flow of RI measurement by the control device 7 are depicted in FIG. 3. The measurement of the differential refractive index by the liquid chromatograph 1 is started after assembling a system configuration adapted to measurement conditions such as types of separation columns and detectors to be used.

First, the control device 7 determines the adjustment value of the phase difference between the sample pump 21 and the reference pump 22 (Step S1). Next, the control device 7 adjusts the phase difference between the two pumps 21, 22 based on the determined adjustment-value of the phase difference between the pumps (Step S2). Next, the control device 7 sends the solvent to the sample cell 51 and the reference cell 52 to confirm stability of the baseline of the output signal of the light detector 53 (Step S3). When stability is confirmed, the control device 7 injects the sample and starts detection of the refractive index (Step S4).

FIG. 4 depicts detailed steps of the adjustment-value determination step S1 of the phase difference between pumps in the flowchart of FIG. 3. In Steps S11 to S15, the adjustment value (offset angle) of the phase difference between pumps such that the final (optimized) noise waveform becomes the minimum is determined based on the noise waveform information acquired from the RI detection part 5 and the pulsation-waveform information of pumps that causes the noise. The case when the noise waveform becomes the minimum may be a case when the amplitude of the noise waveform becomes the minimum; however, it is preferred to calculate an area value as depicted in the noise waveform of FIG. 10 (D), and to determine the adjustment value of the phase difference between pumps such that this area value becomes the minimum. The area value having a line that connected troughs of each changing cycle as a standard is depicted as one example. Since the noise waveform depicted here is a combined waveform of the noises generated by pulsations from pumps, it can be judged faster by evaluating with an integrated value such as the area value.

A case of when the phase-information acquisition means 75 of the pump is a pulsation-information acquisition means that acquires the pulsation-waveform informations of the two pumps, and the pulsation-waveform informations of pumps from the pulsation detectors 25, 26 are used as the phase informations of pumps is described. The pulsation waveforms of pumps are acquired by the pulsation detectors 25, 26 provided to the discharging ports of each pump. For example, a pressure gauge may be used as the pulsation detector to measure the change in the solvent pressure or the current-value waveform of the drive motor of the pump.

Instead of acquiring the pulsation-waveform information, the phase information of the reciprocation of the pump may be acquired to determine the adjustment value of the phase difference between pumps based on the phase information of the pumps and the noise waveform information. For example, when detecting the phase information of the pump based on the phase detectors 23, 24 configured with a chopper and a photointerrupter, it may be confirmed in advance whether the phase angle of the cam detected by the phase detector 23 and the phase angle of the cam detected by the other phase detector 24 match, and whether the two pumps can be driven in a synchronous mode (the phase difference being zero). When the detection timing of the phase detector needs to be adjusted, the mounting position of the chopper may be changed, or a correction value may be set.

In the following, the adjustment-value determination step of the phase difference between pumps is described with reference to FIG. 4. First, in Step S11, the control device 7 synchronizes and drives the sample pump 21 and the reference pump 22 to make the state of the solvent being sent to both of the sample cell 51 and the reference cell 52. Then, the drain valve 28 of the reference pump 22 is released. Accordingly, it becomes a state that the sending of the solvent to the reference cell 52 is stopped while the reference cell 52 is filled up with the solvent, and a state that the solvent is being sent the sample cell 51. Then, the control device 7 acquires the pulsation-waveform information from the pulsation detector 25 of the sample pump 21 in the state that the solvent is being sent to the sample cell 51, and acquires the output signal of the light detector 53 for a predetermined time. The output signal from the light detector 53 is a signal of a baseline of the RI detection part 5 and contains a periodic noise waveform. The control device 7 reads out the noise waveform information from the baseline.

Figure 6:
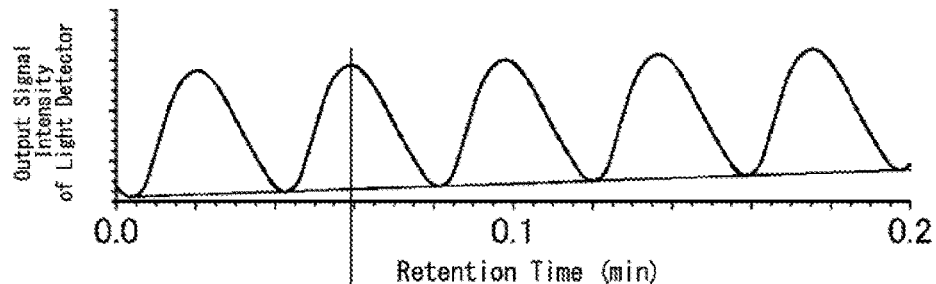
FIG. 6 (A) depicts one example of a noise waveform of the sample side acquired when the adjustment value is determined in the first embodiment.
Figure 6:
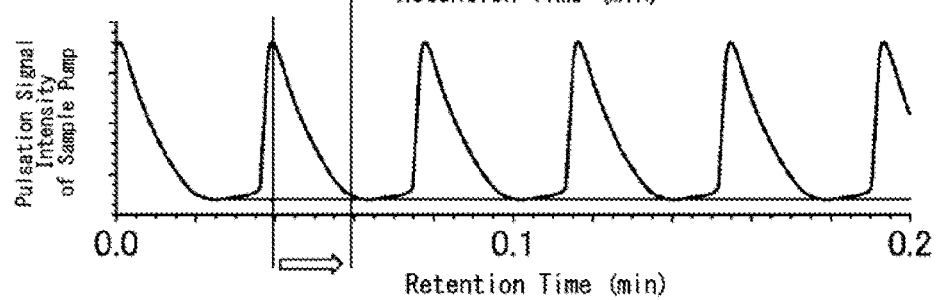

The baseline signal acquired in Step S11 is depicted in FIG. 6 (A). In order to show the noise waveform clearly, the scale of the signal-intensity axis is enlarged. A noise waveform of which one cycle is about 2.4 seconds can be confirmed. The change in the pulsation signal intensity of the sample pump 21 in Step S11 is depicted in FIG. 6 (B). The pulsation waveform of the same cycle as FIG. 6 (A) can be confirmed in FIG. 6 (B). In the peaks of the noise waveform of FIG. 6 (A), deviation of the phase of about 1.2 seconds relative to the peaks of the pulsation waveform of FIG. 6 (B) can be confirmed.

Next, in Step S12, the control device 7 closes the drain valve 28 of the reference pump 22 to make the reference cell 52 in a state that the solvent is being sent thereto. In addition, the control device 7 releases the drain valve 27 of the sample pump 21, and stops the sending of the solvent to the sample cell 51 in a state that the sample cell is filled up with the solvent. Then, the control device 7 acquires the pulsation-waveform information from the pulsation detector 26 of the reference pump 22 in a state of sending the solvent to the reference cell 52, and acquires the output signal of the light detector 53 as a baseline for a predetermined time. The control device 7 reads out the noise waveform information from the acquired baseline.

Figure 7:
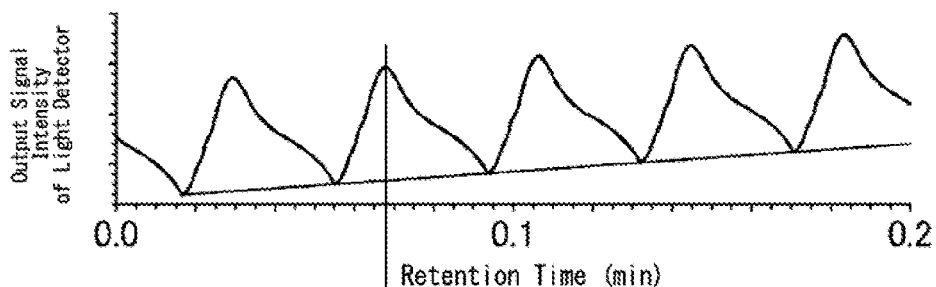
FIG. 7 (A) depicts one example of a noise waveform of the reference side acquired when the adjustment value is determined in the first embodiment.
Figure 7:
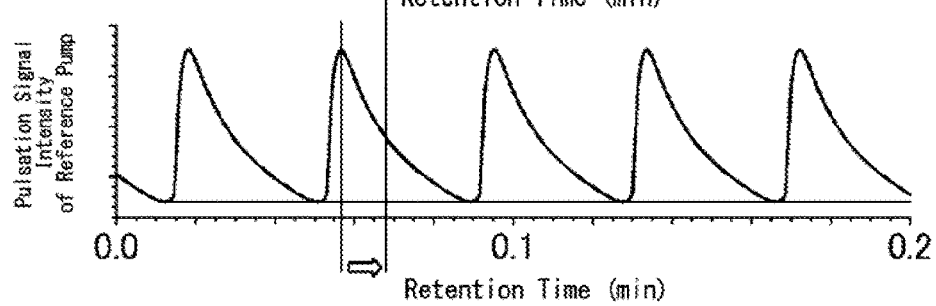

A signal of the baseline acquired in Step S12 is depicted in FIG. 7 (A). The change in the pulsation signal intensity of the reference pump 22 in Step S12 is depicted in FIG. 7 (B). In either of the waveform information, the waveform of the same cycle as in Step S11 can be confirmed. Deviation of the phase of about 0.6 seconds in the relationship between the peak of the pulsation waveform of FIG. 7 (B) and the peak of the noise waveform of FIG. 7 (A) can be confirmed.

In terms of the structure of the detection cell of the RI detector 5, the polarities of the detected signals are inverted in the noise waveform due to pulsation propagated to the sample cell 51 and the noise waveform due to pulsation propagated to the reference cell 52. In the present embodiment, in order to make comparison of the phases of the noise waveforms acquired in Step S11 and Step S12 easier, the polarity of the signal output of the light detector 53 is inversed from Step S11 when the output signal of the light detector 53 is detected in Step S12. Accordingly, the polarities of the noise waveform of FIG. 6 (A) and the noise waveform of FIG. 7 (A) as displayed match.

In Step S13, based on the pulsation waveform informations of the pumps 21, 22, the control device 7 reads out the adjustment amount of the time axis such that the phases of the pumps 21, 22 of when the pulsation waveforms are acquired match. Then, the time axes of the two noise waveform informations are adjusted.

Figure 8:
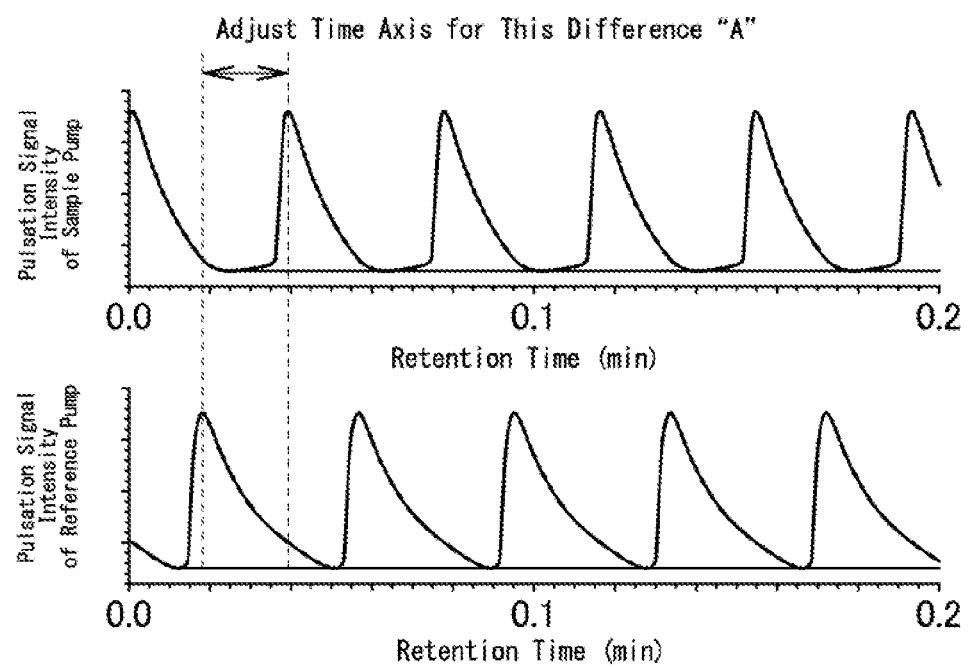
FIG. 8 is to describe the method for adjusting time axes of the pulsation waveforms of both pumps executed when the adjustment value is determined in the first embodiment.
Figure 9:
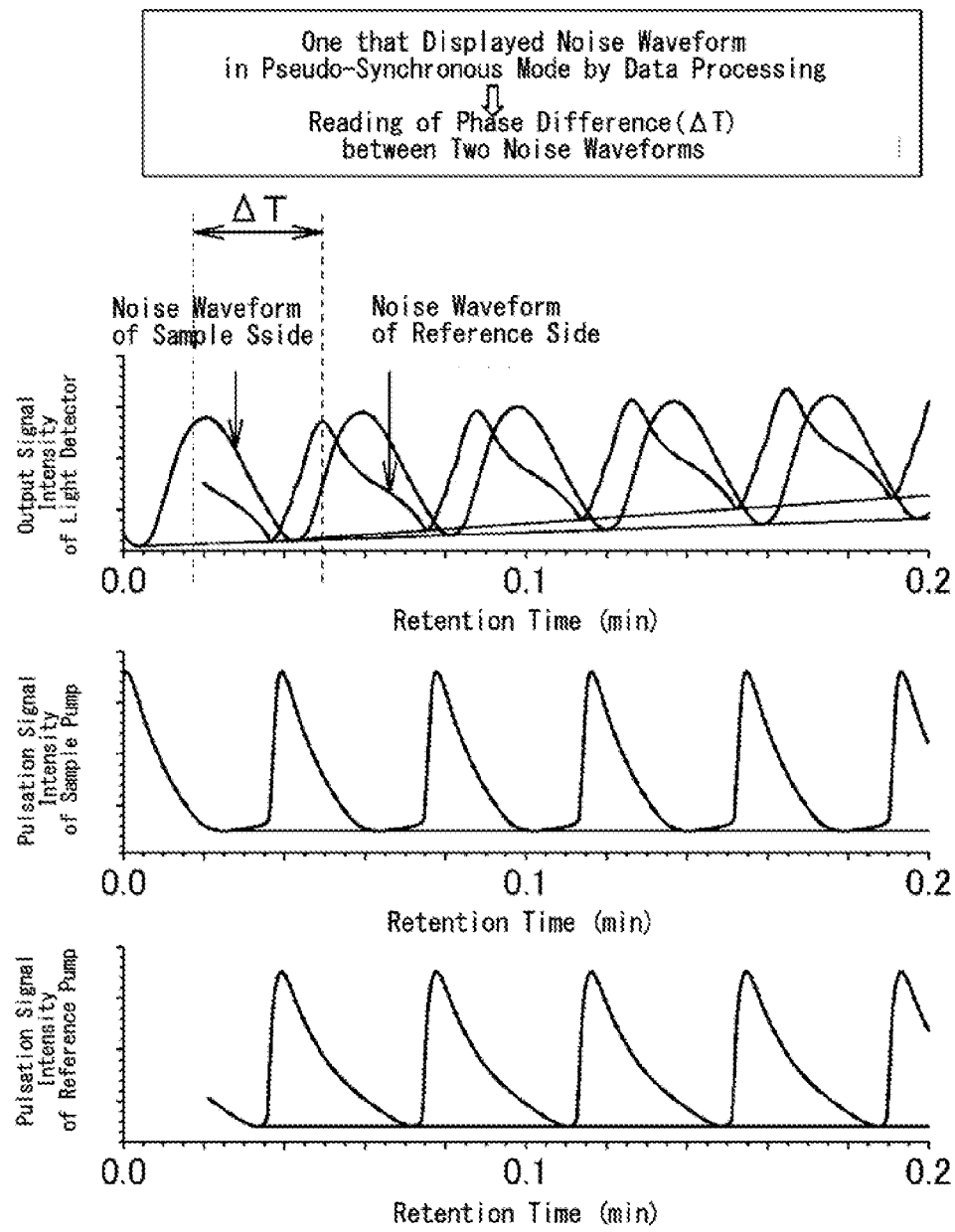
FIG. 9 is to describe the method for reading out the adjustment value from two noise waveforms in the first embodiment.

Specific processing method of the waveform information is described with FIG. 8 and FIG. 9. The pulsation waveform of the sample pump of Step S11 (FIG. 6 (B)) and the pulsation waveform of the reference pump of Step S12 (FIG. 7 (B)) are depicted in FIG. 8. In Step S13, for example, the time lag between the peak tops of the two pulsation waveforms is read out as the phase difference (Difference A) between the two pumps 21, 22. Difference A may be calculated by comparing each one peak top, but it may also be calculated by comparing about 40 peak tops in the pulsation waveform. In the example of FIG. 8, the phase of the sample pump is about 1.2 seconds faster than the phase of the reference pump. The time axes of the noise waveform (FIG. 6 (A)) at Step S11 and the noise waveform (FIG. 7 (A)) at Step S12 are adjusted for the amount of Difference A. That is, the time axis of the signal of the baseline of the reference side depicted in FIG. 7 (A) is delayed for the amount of Difference A. One that overlapped the baseline of the reference side and the baseline of the sample side of which the time axis is adjusted is depicted at the upper part of FIG. 9. The middle part of FIG. 9 is the pulsation waveform of the sample pump 21, and the lower part of FIG. 9 is the pulsation waveform of the reference pump 22 after adjustment of the time axis.

It can be said that the two noise waveforms in the upper part of FIG. 9 are each component of the noise waveform acquired by a pseudo-synchronous mode. Each component indicates the component of the noise waveform due to pulsation propagated to the sample cell and the component of the noise waveform due to pulsation propagated to the reference cell. That is, the noise waveform that is actually detected when the pumps are driven in a synchronous mode can be regarded as one of which the components of these two noise waveforms are overlapped.

In Step S14, the phase difference (ΔT) of the two noise waveforms is read out based on the two noise waveform informations in the upper part of FIG. 9. For example, the time lag between the peak top of the baseline of the reference side after the time-axis adjustment and the peak top of the baseline of the sample side may be read out. The phase difference (ΔT) of the read-out noise waveforms is the phase difference that should be set to the two pumps 21, 22. The example of FIG. 9 indicates that the noise waveform of the reference side is about 1.9 seconds behind the noise waveform of the sample side.

Step S15 is a processing for converting the phase difference (ΔT) between the noise waveforms to a difference between phase angles (Δθ, called as an offset angle) based on the noise cycle (T) of the baseline of the reference side. This offset angle Δθ is used as the adjustment value of the phase difference between the pumps 21, 22. Equation of angle conversion is as shown in Equation (1).

(Math. 1)

$$\Delta T/T \times 360 \text{ degrees} = \Delta\theta \text{(in degrees)} \quad (1)$$

By executing the above Steps S11 to S15, the adjustment value of the phase difference between pumps such that the noise level of the baseline signal of the RI detection part 5 becomes the minimum can be determined.

FIG. 5 depicts detailed steps of Step S2 for adjusting the phase difference between pumps in the measurement flow of FIG. 3. In Step S21, the control device 7 rotates the drive motor of the sample pump 21 at a low speed, and stops the sample pump 21 at a rotation position where the chopper of the pump 21 blocks the photointerrupter. Next, in Step S22, the control device 7 rotates the drive motor of the reference pump 22 at a low speed, and rotates until a rotation position where the chopper of the pump 22 blocks the photointerrupter.

Based on the adjustment value (offset angle Δθ) of the phase difference between the pumps of Step S23, the control device 7 stops the reference pump 22 at a blocking position of the chopper when the offset angle Δθ is zero degrees (Step 24). Or, when the offset angle Δθ is any degrees other than zero degrees, the control device 7 further rotates the reference pump 22 for the amount of the offset angle Δθ, and then stops the reference pump 22 (Step 25).

By executing the above Steps S21 to S24 (or S25), the phase difference between pulsations from each pump 21, 22 is calibrated, and the phases of each pulsation in the sample cell 51 and the reference cell 52 become different for a half cycle to cancel each other. As a result, the noise level contained in the output signal of the light detector 53 can be minimalized.

Regarding the blocking positions by the choppers in each pump, it is sufficient if the phases of each pump at the blocking position match, and the blocking position does not have to be of a specific phase angle. For example, the blocking position by the chopper may be set to a liquid-sending start position of the plungers of each pump.

Figure 10:
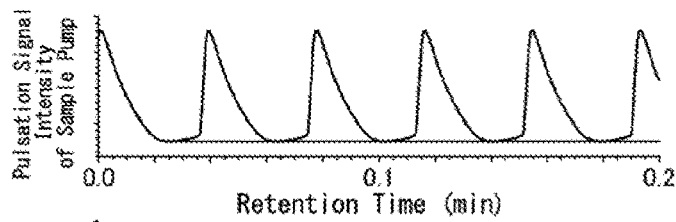
Figure 10:
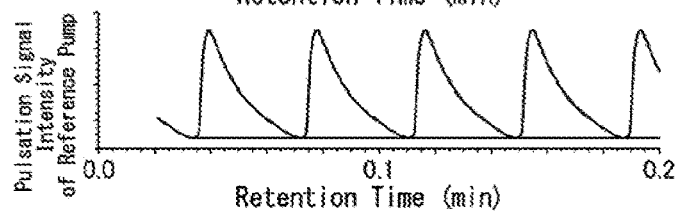
Figure 10:
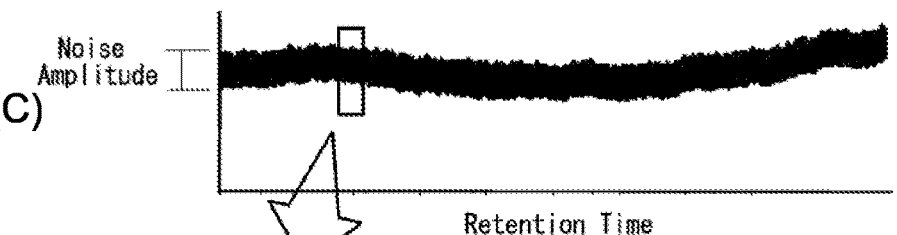
Figure 10:
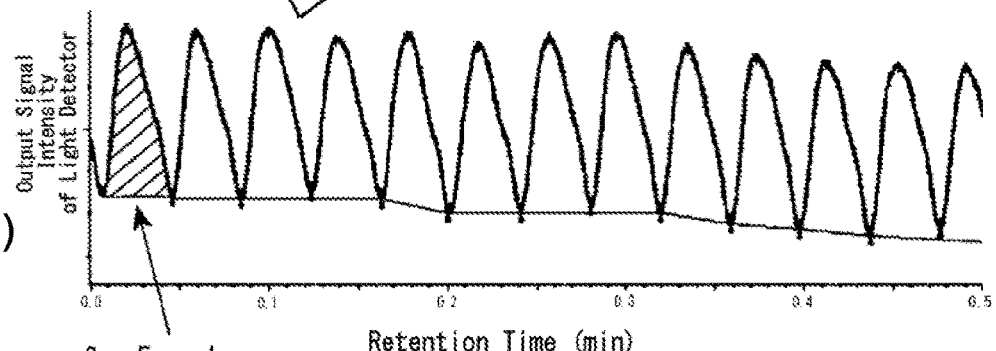

For comparison, FIG. 10 depicts the noise amplitude of the baseline when the dual-flow type liquid chromatograph is driven in a synchronous mode. That is, FIG. 10 depicts the output signal of the RI detection part measured in a state that the phases of the two pumps at the same rotation speed match without executing adjustment of the phase difference between pumps. Pulsation waveforms of each pump synchronizes at the same frequency (FIG. 10 (A), (B)). Since no interference wave of pulsation occurs at the RI detection part, a baseline having a substantially constant noise amplitude can be acquired (FIG. 10 (C)). As is clear from FIG. 10 (D) of which the scale of the signal intensity axis of the baseline is enlarged, there was still room for improvement in this noise amplitude.

In the dual-flow type, it is important to make the system volumes of each channel of the sample side and the reference side equivalent in terms of securing stability of the baseline; however, it is difficult to completely match the system volumes. This is because when the measurement condition changes, the measurement device is selected in accordance with the condition; therefore, the system volumes of each channel change. For example, in a case of liquid chromatography, it is desired to avoid providing the same column as the column provided to the channel of the sample side to the reference side in terms of cost.

Whereas, in comparison to the dual-flow type liquid chromatography that is the same as FIG. 10, the nose amplitude of the baseline when adjustment of the phase difference between pumps of the present embodiment is executed is depicted in FIG. 11. The rotation speeds of the two pumps are the same; however, as a result of adjusting the phase difference, the phase differs for the predetermined phase difference ΔT (FIG. 11 (A), (B)). The noise amplitude of the baseline is greatly reduced compared to FIG. 10, and it can be seen that a stable baseline can be acquired (FIG. 11 (C), (D)).

As a result of executing adjustment of the phase difference between pumps of the present embodiment, the noise that occurs in the output signal of the light detector 53 by propagation of pulsation from the sample pump 21 within the sample cell 51 and the noise that occurs in the output signal of the light detector 53 by propagation of pulsation from the reference pump 22 within the reference cell 52 cancel each other. Accordingly, even if there is a difference between the system volumes of each channel of the sample side and the reference side (specifically, the channels from the liquid-sending pumps to the RI detection part), the noise amplitude of the baseline can be reduced by executing adjustment of the phase difference between pumps. A stable RI chromatogram can be acquired, and reliability of qualitative/quantitative analysis of each component improves.

According to the measurement program of the present embodiment, the suitable adjustment value of the phase difference between the two pumps can be determined automatically. With this adjustment value, the phase difference between pumps can be adjusted automatically.

Figure 12:
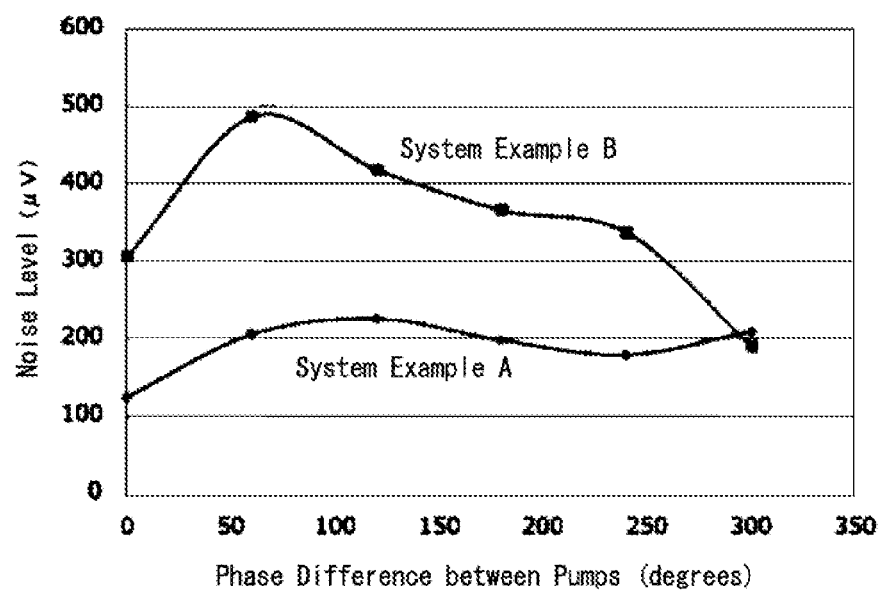
FIG. 12 is to describe the method for adjusting the phase difference between pumps of a second embodiment.

The adjustment method of the phase difference between pumps according to a second embodiment is described with reference to FIG. 12. The two graphs in FIG. 12 are actual measured values of a relation between the phase difference between pumps (horizontal axis) and the noise level (vertical axis) with respect to the two analysis devices of System A and System B. The inventors experimentally confirmed the existence of the phase difference of which the noise amplitude of the baseline becomes the minimum in the system configuration when the phase difference between the two liquid-sending pumps is changed sequentially. To what degree should the phase difference between pumps be set to minimize the noise amplitude of the baseline depends on the system volume, the type of the solvent, and a system pressure; therefore, it is necessary to experimentally confirm for each system configuration.

Thus, the adjustment method of the phase difference between pumps according to the second embodiment comprises steps of: scanning the phase difference between pumps while monitoring the baseline; finding out the phase difference of which the noise level of the baseline becomes the minimum; and determining the optimal phase difference for the system (with system volume, type of mobile phase or system pressure).

Figure 13:
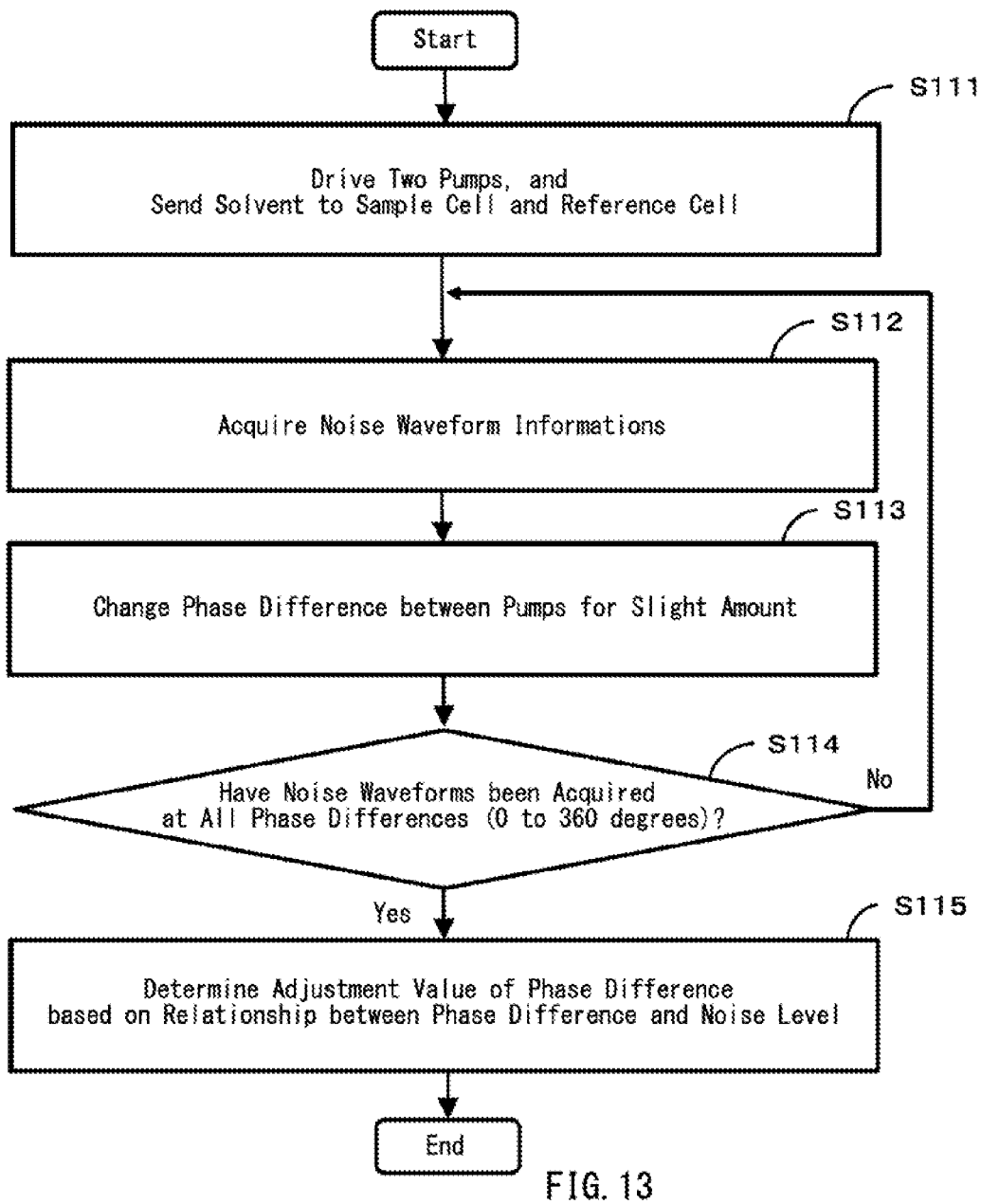
FIG. 13 is a flow chart for determining the adjustment value of the phase difference between pumps of the second embodiment.

FIG. 13 depicts the flow of the adjustment method of the phase difference between pumps according to the second embodiment. The two liquid-sending pumps of the liquid chromatography are driven to send the solvent to the sample cell and the reference cell (S111). In that state, the noise level of the RI detection part is acquired (S112). Next, the phase difference between the pumps is slightly changed (S113). Then, the noise level is acquired at the changed phase angle (S112). The series of steps S112 and S113 are repeated until acquisition of the noise level in a range of the phase difference from 0 to 360 degrees is completed (S114). When acquisition of the noise level is completed in a range of the phase difference from 0 to 360 degrees, the phase difference of which the noise level becomes the minimum is read out based on the relationship between the acquired phase difference and the noise level, and the phase difference is set as the adjustment value of the phase difference between the pumps (S115).

The adjustment value of the phase difference between the pumps can be determined by the above method (S111 to S115) of the second embodiment. However, since a channel of some length exists between the liquid-sending pump and the detection cell, there occurs a time lag of a certain amount between when the phase difference between pumps is changed for a slight amount while monitoring the noise waveform until a change in noise waveform that is actually been monitored occurs. Accordingly, the method of the first embodiment is superior when shortening of adjustment time or certainty is regarded to be important.

Figure 14:
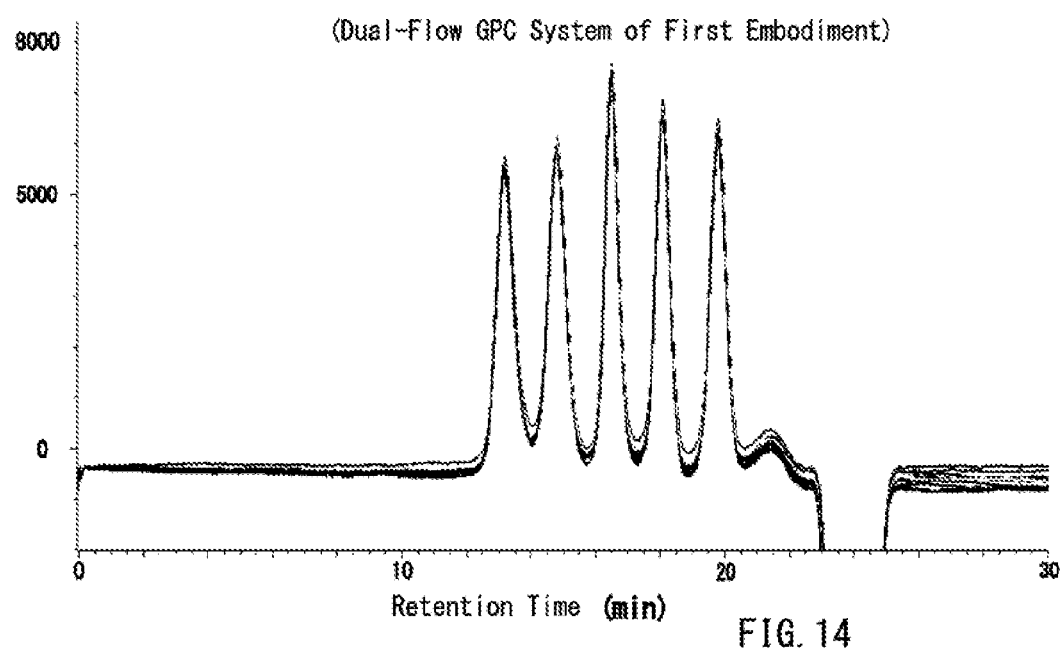
FIG. 14 depicts one example of a chromatogram measured when the chromatograph of the first embodiment is applied to a GPC (dual-flow type).
Figure 15:
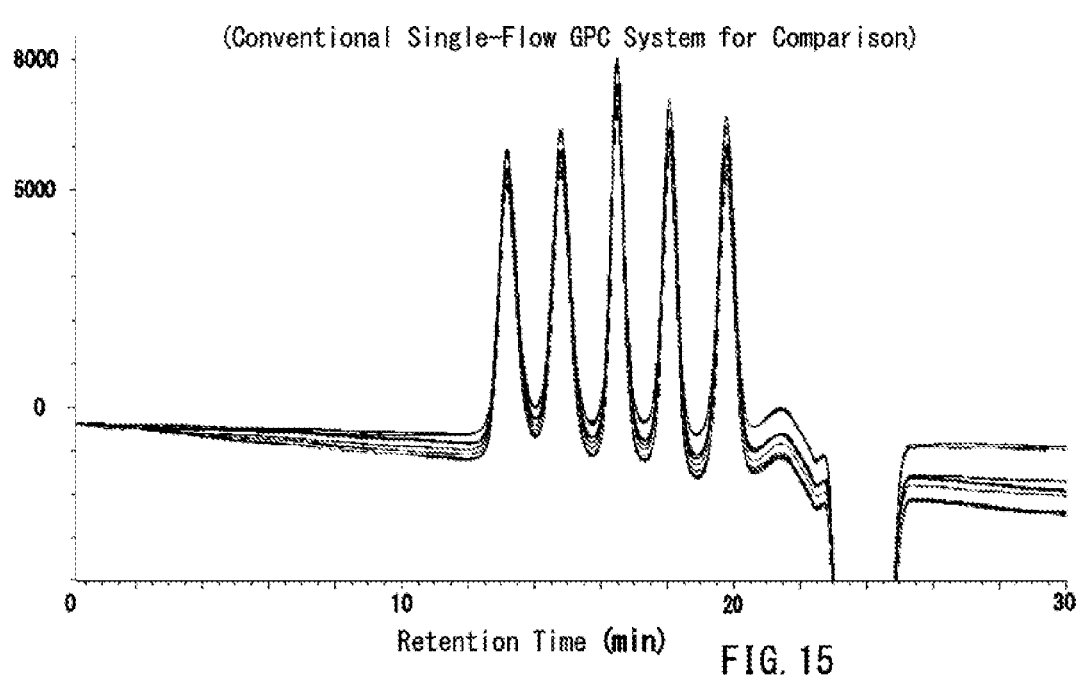
FIG. 15 depicts one example of a chromatogram measured with a conventional GPC (single-flow type) for comparison.

Lastly, FIG. 14 depicts one example of the chromatogram when the chromatograph of the first embodiment is applied to GPC (dual-flow type). For comparison, FIG. 15 depicts one example of the chromatogram measured by a conventional GPC (single-flow type). The vertical axis is the differential refractive index, and the horizontal axis is retention time. In either case, tetrahydrofuran (THF) that does not contain a stabilizer was used as the mobile phase, and a polystyrene standard sample consisting of five components was used as the sample. The number of repetitions is respectively ten times.

It can be seen when the two are compared that, in the chromatogram of FIG. 14 according to the present embodiment, there is no drift in the baseline like the chromatogram of FIG. 15, a stable baseline is acquired, and repeatability of measurement is excellent. Even a mobile phase of an unstable composition such as THF that does not contain a stabilizer is used as the solvent, a stable baseline of the RI detector can be achieved.

GPC that is generally known as a device with RI detector is described in the above embodiments; however, the present invention is not limited to applications to GPC, and can be applied to various analysis devices that uses RI detectors such as sugar analysis.

REFERENCE SIGNS LIST

1 Liquid chromatograph (measurement device of differential refractive index)
2 A pair of liquid-sending pumps
21 Sample pump
22 Reference pump
23,24 Phase detector of pump
25,26 Pulsation detector of pump
3 Sample injection part
4,40 Column oven
41 Separation column (separation part)
42 Reference loop
43 Temperature regulator of sample side
44 Temperature regulator of reference side
5 RI detection part
51 Sample cell
52 Reference cell
53 Light detector
6 Solvent bottle
7 Control device (computer)
91 Solvent mixer of sample side
92 Solvent mixer of reference side

The invention claimed is:

1. A measurement method of a differential refractive index between a sample liquid and a reference liquid by sending the sample liquid to a sample cell with a sample pump, sending the reference liquid to a reference cell with a reference pump, and detecting a change in direction of travel of light sequentially transmitted through the sample cell and the reference cell with a light detector, the measurement method comprising:

determining an adjustment value of a phase difference between the sample pump and the reference pump based on noise waveform informations that occur in an output signal of the light detector, so that the phase difference is adjusted according to a difference in lengths of channels of the sample liquid and the reference liquid or a difference in devices connected to the channels of the sample liquid and the reference liquid; and adjusting the phase difference between the sample pump and the reference pump before starting measurement of the differential refractive index, wherein during the adjusting of the phase difference, adjusting the phase difference between the sample pump and the reference pump so that a noise that occurs in the output signal of the light detector by propagation of pulsation from the sample pump within the sample cell and a noise that occurs in the output signal of the light detector by propagation of pulsation from the reference pump within the reference cell cancel each other.

2. The measurement method of claim 1, wherein the determining of the adjustment value comprises:

acquiring a phase information of the sample pump and the noise waveform informations in the output signal of the light detector in a state that the reference pump is stopped sending a solvent to the reference cell after enclosing the solvent in the reference cell, and the sample pump is operating to send the solvent to the sample cell;

acquiring the phase information of the reference pump and the noise waveform informations in the output signal of the light detector in a state that the sample pump is stopped sending the solvent to the sample cell after enclosing the solvent in the sample cell, and the reference pump is operating to send the solvent to the reference cell; and determining the adjustment value of the phase difference between the two pumps by comparing the two noise waveforms in a state that two phases of the two pumps match based on the phase informations of the two pumps and the two noise waveform informations, by reading out a phase difference between the two noise waveforms, and by determining the adjustment value of the phase difference between the two pumps based on the phase difference between the two noise waveforms.

3. The measurement method of claim 2, wherein during the acquiring of the noise waveform informations of the sample pump, the reference pump is stopped in a state of the enclosed reference cell with the solvent, and during the acquiring of the noise waveform informations of the reference pump, the sample pump is stopped in a state of the enclosed sample cell with the solvent.

4. The measurement method of claim 2, wherein during the acquiring of the noise waveform informations of the sample pump, a drain valve of the discharge side of the reference pump is released while the reference pump is driven in a state of the enclosed reference cell with the solvent, and during the acquiring of the noise waveform informations of the reference pump, a drain valve of the discharge side of the sample pump is released while the sample pump is driven in a state of the enclosed sample cell with the solvent.

5. The measurement method of claim 2, wherein the determining of the adjustment value comprises adjusting time axes of the two noise waveform informations based on the phase informations of the two pumps so that phases of the two pumps match.

6. A measurement device of a differential refractive index comprising:

a detection part for the differential refractive index having a sample cell that a sample liquid passes through, a reference cell that a reference liquid passes through, and a light detector that detects a change in direction of travel of light that sequentially transmitted through the two cells;

a sample pump that sends a solvent to the sample cell;

a sample injection part that is provided on a channel from the sample pump to the sample cell and injects a sample to the solvent sent from the sample pump to form the sample liquid;

a reference pump that sends the solvent to the reference cell as the reference liquid; and a control device, for measuring the differential refractive index between the sample liquid and the reference liquid based on an output signal of the light detector, wherein the control device comprises:

an adjustment-value determiner that determines an adjustment value of a phase difference between the sample pump and the reference pump based on noise waveform informations that occur in the output signal of the light detector, according to a difference in lengths of channels of the sample liquid and the reference liquid or a difference in devices connected to the channels of the sample liquid and the reference liquid; and a phase-difference adjuster that adjusts the phase difference between the sample pump and the reference pump so that a noise that occurs in the output signal of the light detector by propagation of pulsation from the sample pump within the sample cell and a noise that occurs in the output signal of the light detector by propagation of pulsation from the reference pump within the reference cell cancel each other.

7. The measurement device of claim 6, wherein the measurement device is a liquid chromatograph of which a separation part for separating the sample liquid into each component is provided on the channel from the sample injection part to the sample cell.

8. The measurement device of claim 7 that is a gel permeation chromatograph (GPC).

9. A non-transitory computer-readable storage medium that stores a measurement program of a differential refractive index that makes a computer function to:

drive of a sample pump to send a sample liquid to a sample cell;

drive of a reference pump to send a reference liquid to a reference cell; and acquire an output signal of a light detector that detects light sequentially transmitted through the sample cell and the reference cell, wherein the measurement program that-further makes the computer function to:

determine an adjustment value of a phase difference between the sample pump and the reference pump based on noise waveform informations that occur in the output signal of the light detector, according to a difference in lengths of channels of the sample liquid and the reference liquid or a difference in devices connected to the channels of the sample liquid and the reference liquid; and adjust the phase difference between the sample pump and the reference pump before starting measurement of the differential refractive index, so that a noise that occurs in the output signal of the light detector by propagation of pulsation from the sample pump within the sample cell and a noise that occurs in the output signal of the light detector by propagation of pulsation from the reference pump within the reference cell cancel each other.

10. The non-transitory computer-readable storage medium of claim 9, wherein the measurement program further makes the computer function to:
- acquire respective phase information of the sample pump and the reference pump;
- acquire noise waveform informations that occur in the output signal of the light detector together with the phase information of the sample pump in a state that the reference pump is stopped sending a solvent to the reference cell after enclosing the solvent in the reference cell, and the sample pump is operating to send the solvent to the sample cell;
- acquire noise waveform informations that occur in the output signal of the light detector together with the phase information of the reference pump in a state that the sample pump is stopped sending a solvent to the sample cell after enclosing the solvent in the sample cell, and the reference pump is operating to send the solvent to the reference cell; and
- determine the adjustment-value of the phase difference between the two pumps by comparing the two noise waveforms in a state that two phases of the two pumps match based on the phase informations of the two pumps and the two noise waveform informations, by reading out the phase difference between the two noise waveforms, and by determining the adjustment-value of the phase difference between the two pumps based on the phase difference between the two noise waveforms.

11. The non-transitory computer-readable storage medium of claim 10, wherein the measurement program further makes the computer function to:
- acquire pulsation-waveform informations of the two pumps, and regard the acquired pulsation-waveform informations of the pumps as the phase informations of the pumps.

12. The non-transitory computer-readable storage medium of claim 10, wherein the measurement program further makes the computer function to:
- stop the reference pump in a state of the enclosed reference cell with the solvent, and
- stop the sample pump in a state of the enclosed sample cell with the solvent.

13. The non-transitory computer-readable storage medium of claim 10, wherein the measurement program further makes the computer function to:
- release a drain valve of the discharge side of the reference pump while the reference pump is driven in a state of the enclosed reference cell with the solvent, and
- release a drain valve of the discharge side of the sample pump while the sample pump is driven in a state of the enclosed sample cell with the solvent.

\* \* \* \* \*